United States Patent [19]

Clemens

[11] Patent Number: 4,627,531
[45] Date of Patent: Dec. 9, 1986

[54] RECORDING DISK ENCLOSURE

[76] Inventor: Philip M. Clemens, 2424 Forest Park Blvd., Fort Wayne, Ind. 46805

[21] Appl. No.: 726,790

[22] Filed: Apr. 24, 1985

Related U.S. Application Data

[63] Continuation-in-part of Ser. No. 709,399, Mar. 7, 1985.

[51] Int. Cl.$^4$ ............................................. B65D 85/57
[52] U.S. Cl. ..................................... 206/309; 206/312; 206/444; 206/445; 220/346; 220/351
[58] Field of Search .................... 206/309, 311–313, 206/444, 445; 220/331, 345–351; 312/8–13

[56] References Cited

U.S. PATENT DOCUMENTS

| | | | |
|---|---|---|---|
| 1,597,092 | 8/1926 | McTighe | 220/331 |
| 2,899,047 | 8/1959 | Butner et al. | 220/345 |
| 3,131,841 | 5/1964 | Grogan | 220/331 |
| 3,278,009 | 10/1966 | Crump, Jr. | 220/345 |
| 3,343,709 | 9/1967 | Henderson | 220/348 |
| 4,320,831 | 3/1982 | Szabo et al. | 220/345 |
| 4,397,388 | 8/1983 | Quaranta | 206/309 |
| 4,420,079 | 12/1983 | Gliniorz et al. | 206/387 |

FOREIGN PATENT DOCUMENTS

| | | | |
|---|---|---|---|
| 0180183 | 9/1905 | Fed. Rep. of Germany | 220/331 |
| 0546337 | 11/1922 | France | 220/331 |

*Primary Examiner*—William Price
*Assistant Examiner*—Jimmy G. Foster
*Attorney, Agent, or Firm*—Rodger H. Flagg

[57] ABSTRACT

A recording disc enclosure is disclosed, having semi-rigid top and bottom portions, with adjoining sides forming an enclosed space therebetween. An aperature sized to pass a recording disc therethrough is disposed through one side of the enclosure. A closure strip is disposed to cover the aperature in the closed position, and to be manually biased along a top and bottom guide path to extend substantially beyond the profile of the enclosure in the open position. The closure strip, when in the open position may be biased to rotate approximately 90 degrees to an open position in alignment with one of the sides adjoining the aperture side. Top or bottom portions of the enclosure may be transparent to provide a visual indication of the contents of the enclosure. Alternately visual symbols may be disposed upon the top or bottom portion of the enclosure, and preferably upon at least one side, to provide identification of the contents of the enclosure.

16 Claims, 9 Drawing Figures

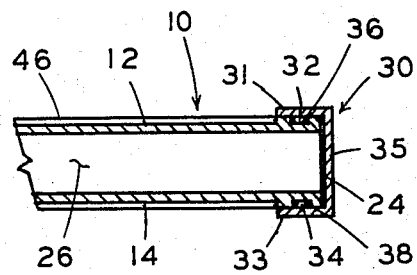
FIG. 3A
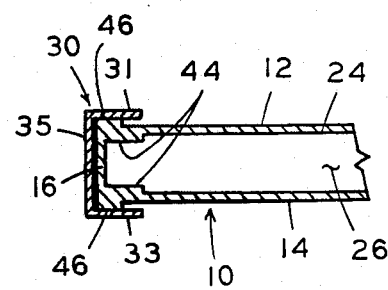
FIG. 3B
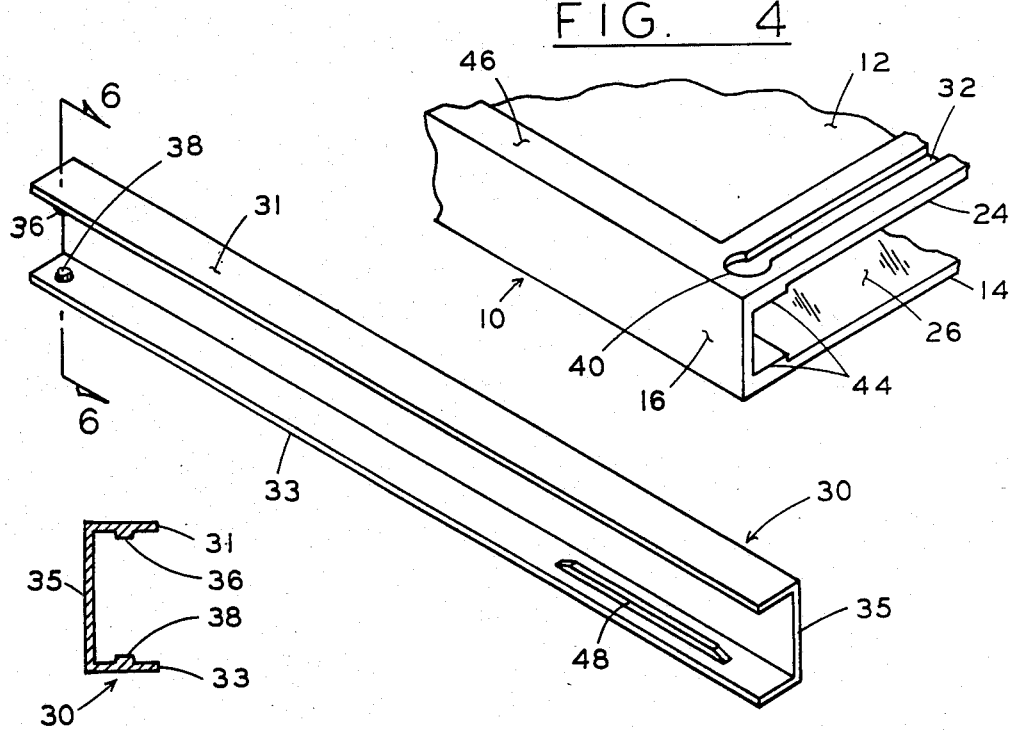
FIG. 4
FIG. 6
FIG. 5

RECORDING DISK ENCLOSURE

BACKGROUND OF THE INVENTION

This application is a continuation-in-part of co-pending application entitled "Digital Audio Disk Enclosure", Ser. No. 709,399, filed Mar. 7, 1985.

FIELD OF THE INVENTION

This invention relates generally to enclosures; more specifically to enclosures for protecting a recording disc, such as optical discs, video discs, magnetic discs, CD-ROM discs, Draw and Edraw discs, and the like during storage and transport.

BACKGROUND OF THE INVENTION

Phonograph records have traditionally been kept in open ended cardboard sleeves. Often a protective paper sleeve has been inserted within the cardboard sleeve to increase protection. Due to the greater expense, longer life, and increased capacity of recording discs over conventional records, a more substantial enclosure is needed.

Video disc enclosures are known in the art, such as the enclosures disclosed in U.S. Pat. Nos. 4,084,691; 4,084,694; and 4,463,849. These enclosures typically employ removable sleeves to support the video disc as it is inserted or removed from the enclosure. Various means are employed to releasably secure the sleeve within the enclosure.

Efforts to improve the protection of recording discs within an enclosure include the use of a hinged spine with sides that open like a book, such as the digital audio disk enclosure marketed by MCA Records, of Universal City, Calif. A variation of this design approach utilizes a second hinged portion in parallel alignment with the first hinged spine to selectively expose a portion of the recording disc for ease of handling. Such enclosures are expensive to manufacture, require elaborate tooling, and have openings exposed to the environment that allow dust and other particles to enter the recording disc enclosure.

Therefore, what is needed is an attractive, inexpensive enclosure for storing and transporting recording discs that is easy to manufacture, affords a protective environment secure from dust and related particles, is economical to manufacture, and provides for ease of insertion and removal of the recording disc from its enclosure.

Enclosures having a biasing means are known, such as U.S. Pat. Nos. 4,351,435; 3,851,734; 1,214,158; 519,578 and Des. Pat. No. 174,300. However, these enclosures are not readily adaptable for storage of recording discs. They are relatively expensive to manufacture, and do not lend themselves to visual identification of the contents of the enclosure. This is important where the user has a quantity of such enclosures, and therefore needs a way to quickly identify the contents of each enclosure. Many of these enclosures having a biasing means have an internal guide means which provides an internal lip along the opening edge of the enclosure that would interfere with the easy removal of a recording disk from within such an enclosure.

SUMMARY OF THE INVENTION

The present invention discloses an inexpensive enclosure for storing and transporting a recording disc, which has an externally disposed guide means for receiving a closure strip which has top and bottom edges adjoining the side of the closure strip. When the closure strip is manually biased to its closed position, the contents of the enclosure is substantially protected from its external environment. To remove the contents from the enclosure, the closure strip is manually biased towards its open position, exposing an aperature of a size sufficient to pass a recording disk therethrough. When the closure strip is manually biased to its fully open position, the closure strip may be rotated from a first open position in alignment with the aperature side of the enclosure and extended substantially beyond the profile of the enclosure, to a second open position by rotating the closure strip approximately 90 degrees to a stored position in alignment with an adjoining side of the enclosure.

Therefore, one object of this invention is to provide an improved enclosure for storage and transport of a recording disc enclosed therein.

Another object is to provide an enclosure having an external closure strip for manually biasing between open and closed positions to selectively expose or enclose a recording disc stored therein.

Another object is to provide an enclosure having an externally guided closure strip for manual biasing from a closed position wherein the recording disc is substantially protected from its external environment, to an open position wherein the closure strip is extended substantially beyond the profile of the enclosure.

Another object is to provide a means to manually rotate the closure strip from its first open position in alignment with the aperature side of the enclosure and extended substantially beyond the profile of the enclosure, to an open stored position by rotating the closure strip approximately 90 degrees into alignment with an adjoining side of the enclosure.

Another object of this invention is to provide an enclosure sized to receive a recording disc and a pamphlet therein, wherein the pamphlet is not substantially greater in size than the recording disc diameter, and not substantially thicker than one-quarter inch when folded for insertion within the enclosure.

Another object is to provide a recording disc enclosure having visual symbols disposed thereon upon at least one of the top and bottom portions and upon at least one adjoining side of the enclosure.

Yet another object is to provide an improved recording disc enclosure embodying any combination of the other objects of invention disclosed herein.

The above mentioned and other features and objects of this invention and the manner of attaining them will become more apparent and the invention itself will be best understood by reference to the following discription of an embodiment of the invention taken in conjunction with the accompanying drawings.

BRIEF DESCRIPTION OF THE DRAWINGS

FIG. 3A is a cross sectional view of a portion of the enclosure taken along lines 3A—3A in FIG. 1.

FIG. 3B is a cross sectional view of a portion of the enclosure taken along lines 3B—3B in FIG. 2, with the closure strip rotated into an open stored position in alignment with an adjoining side of the enclosure.

FIG. 4 is an enlarged view of a portion of the enclosure with the closure strip removed, showing the rotation end of the guide means.

FIG. 5 is a perspective view of the closure strip showing the complimentary guide means disposed upon the top and bottom edges of the closure strip.

FIG. 6 is a cross-sectional view of the closure strip taken along lines 6—6 in FIG. 5.

DESCRIPTION OF THE PREFERED EMBODIMENT

Figure 1:
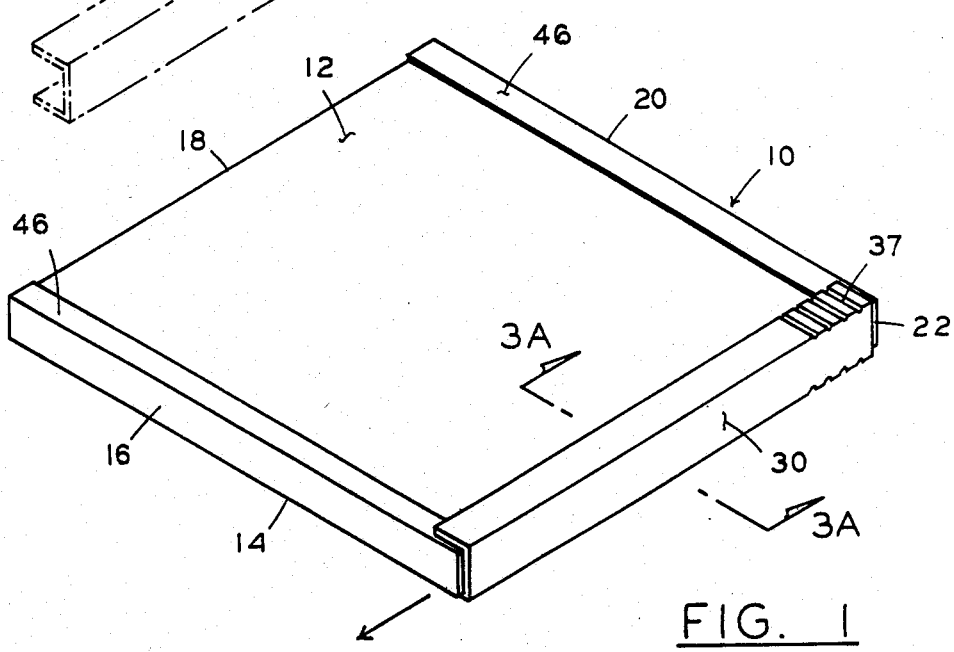
FIG. 1 is a perspective view of an embodiment of the enclosure with the closure strip shown in closed position.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1 shows an embodiment of the recording disc enclosure 10, having a generally semi-rigid rectangular top portion 12, and a generally semi-rigid rectangular bottom portion 14, with sides 16, 18, 20 and 22 adjoining each other and adjoining top and bottom portions 12, 14, about the periphery of the top and bottom portions. Top and bottom portions 12, 14 and sides 16, 18, 20, 22 form an enclosed space 26 therebetween, of a size suitable for storing a recording disc 28, such as an optical disc, video disc, magnetic disc, CD-ROM disc, Draw and Edraw disc, or the like, therein.

An elongated aperature 24, of a size sufficient to receive a recording disc 28 therethrough is disposed in side 22. An elongated, external closure strip 30, having a top edge 31, and a bottom edge 33, adjoining side 35 is slidably disposed along aperature side 22 and adjoining edge of top and bottom portions 12, 14.

An external guide means 32, 34 are disposed substantially along one edge of top and bottom portions 12, 14 in proximity to side 22 of enclosure 10. A complimentary guide means 36, 38 are disposed upon top and bottom edges 31, 33 of closure strip 30, and are positioned to be received and guided by guide means 32, 34.

Figure 2:
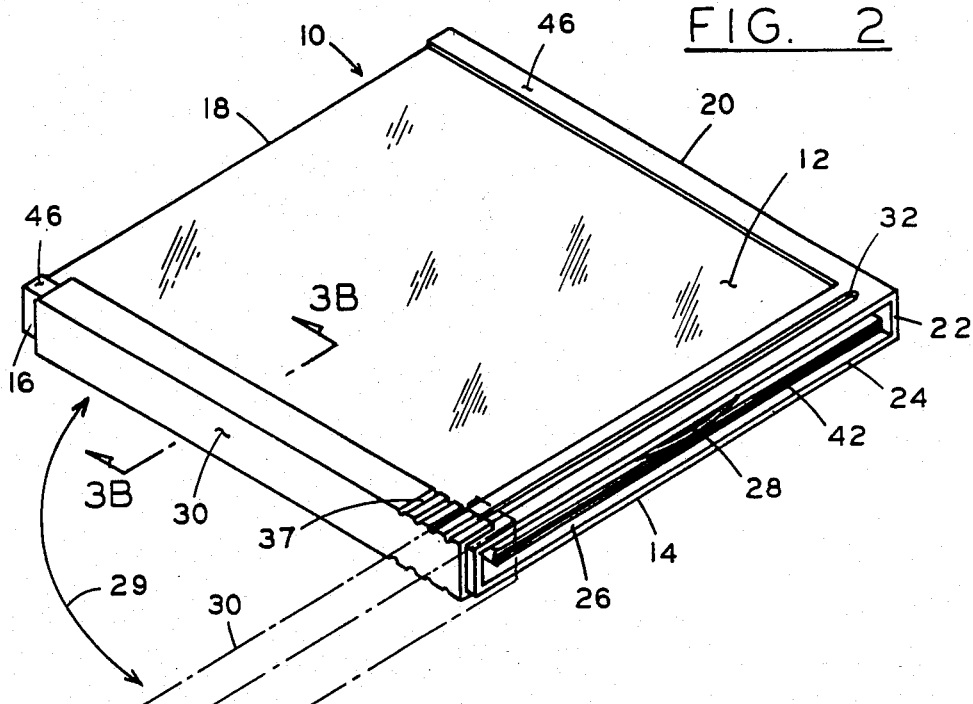
FIG. 2 is a perspective view of the enclosure with the closure strip extended in dod-dashed lines to a first open position extending substantially beyond the profile of the enclosure, with an arrow indicating the direction of rotation of the closure strip in the open position to align with an adjoining side of the enclosure.

As closure strip 30 is manually biased from the closed position shown in FIG. 1 to the open position shown in FIG. 2, the closure strip is first biased along aperature side 22 to a first open position wherein the closure strip 30 extends substantially beyond the profile of enclosure 10, whereupon closure strip 30 is rotated as shown by arrow 29 in FIG. 2, to an open stored position in alignment with adjoining side 16 of enclosure 10. In this position closure strip 30 is out of the way for ease of removing and enclosing a recording disk 28 within enclosed space 26 of enclosure 10.

Figures 7, 8:
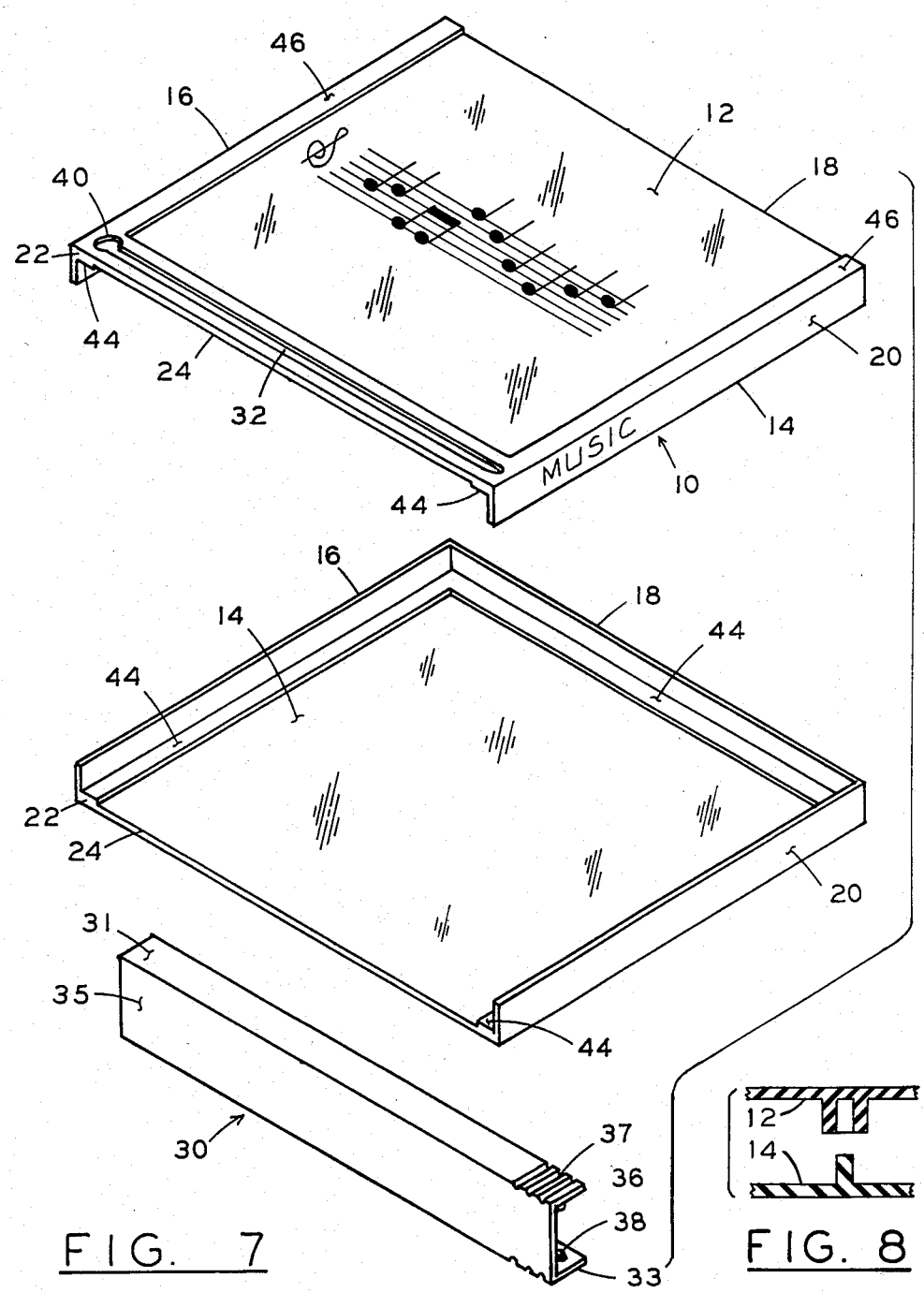
FIG. 7 is an exploded view of the top and bottom portions of the enclosure and the closure strip shown prior to joining.

As shown in FIGS. 4 and 7, an enlarged relieved area 40 is provided at one end of guide means 32, 34, for ease of rotation of complimentary guide means 36, 38 disposed upon the top and bottom edges 31, 33 of guide means 30. Guide means 32, 34 preferably extend substantially along aperature side 22 of top and bottom portions 12, 14, but do not extend to side 16 or 20. Guide means 32, 34 are adapted to slidably receive complimentary guide means 36, 38 for manual biasing closure strip 30 between open and closed positions, shown in FIGS. 1 and 2.

Complimentary guide means 36, 38 are sized to be slidably received within guide means 32, 34 during travel between open and closed positions. The relieved area 40 at one end of the guide means 32, 34 is sized to allow complimentary guide means 36, 38 upon closure strip 30 to rotate upon full extention of closure strip 30, in a manner to align closure strip 30 with adjoining side 16 as shown in FIG. 2.

FIG. 2 shows the closure strip 30 in open position, exposing the recording disc 28 and a pamphlet 42 for removal from enclosed area 26. Preferably, pamphlet 42 is not substantially larger than the diameter of the recording disk 28 in either length or width, and does not exceed one-quarter of an inch in thickness when folded for insertion within enclosure 10.

Closure strip 30 preferably has a manual grasping surface 37 disposed externally upon the top and bottom surfaces 31, 33 of closure strip 30 along one edge for ease of manually biasing closure strip 30 along guide means 32, 34.

Preferably, grasping surface 37 is a pluarity of ridges or grooves extending tangent to biasing movement of closure strip 30.

FIG. 3A is a partial cross sectional view of enclosure 10 taken along lines 3A—3A in FIG. 1. As shown in FIG. 3A, guide means 32, 34, located along an edge of enclosure 10, are positioned to receive complimentary guide means 36, 38 disposed upon the confronting surfaces of closure strip 30 top and bottom edges 31 and 33. As closure strip is manually biased towards the open position shown in FIG. 2, complimentary guide means 36, 38 are slidably biased along guide means 32, 34 to expose aperature 24 for insertion or removal of recording disc 28 from enclosed area 26.

FIG. 3B is a partial cross sectional view of enclosure 10 taken along lines 3B—3B in FIG. 2. As shown in FIG. 3B, the closure strip 30 has been manually rotated into alignment with adjoining side 16. In this position, the contents of enclosure 10 may be readily removed or received. Because the top and bottom portions 12, 14 are semi-rigid, the user may exert finger pressure near the middle of aperature side 22, which will depress to contact the contents partially removed through aperature 24. In this manner, the user may control removal of the contents of enclosure 10 through aperature 24, to precisely position the contents upon suitable equipment using such recording discs, without actually touching the recording disc 28.

A recording disc support 44 may be slightly elevated beyond the internal surface of top and bottom portions 12, 14 to support the edge of the recording disc thereon during insertion, storage or removal of the recording disc from enclosure 10. Recording disc support 44 is preferably sized to support the non-recording edge of recording disc 28, without contacting the recording surface of disc 28. Support 44 may extend substantially along adjoining sides 16, 20 of aperature side 22, and may also extend substantially along side 18 as shown in FIG. 7. Support 44 serves to protect the recording surface of disc 28 from contact with the top or bottom portions of enclosure 10.

As shown in FIG. 7, side pieces 16, 18, 20, 22 are preferably at least in part formed from one of the top or bottom portions 12, 14. The top and bottom portions 12, 14 may be subsequently secured to each other to form an enclosed area 26 therebetween.

Top and bottom portions 12, 14 with sides 16, 18, 20, 22 may be secured by spot welding, glueing, heat staking, by use of snap lock and pin sockets, or by other conventional means known to one skilled in this art.

Joined sides 16, 18, 20, 22 may be provided with an alignment means, such as male and female grooves, notches, bosses or other conventional means to position top and bottom portions 12, 14 for securement as previously disclosed.

Where top and bottom portions 12, 14 are molded with adjoining sides 16, 18, 20, 22 integrally formed as shown in FIG. 7, aperature 24 may be formed by providing a relieved area 47 to form a part of aperature 24 through side 22 along top portion 12. A relieved area 47 may also be disposed along the bottom portion 14 of side 22. When top and bottom portions 12, 14, are aligned and secured, the relieved area 47 are aligned to form aperature 24 in enclosure side 22.

The enclosure 10 may be fabricated of light transmissive material, or alternately, visual symbols such as writing or symbols may be disposed upon at least one of the top and bottom portions, and preferably upon at least one adjoining side, to provide visual indication of the contents of enclosure 10. The visual symbols may be formed directly upon one of the top and bottom or side surfaces, or may be printed or otherwise disposed upon a material such as paper, or the like, which is secured to at least one of the top and bottom portions, or side portion to identify the contents therein.

Where at least one of the top and bottom portions are made of light transmissive material, the contents may be viewed directly through the light transmissive portion, to eliminate or reduce the need for visual symbols disposed upon top or bottom portions 12, 14 or at least one adjoining side portion 16, 18, 20 or 22. Symbols disposed upon enclosure 10 may be in the form of words, letters or pictures, or numbers in the form of printed material, and may be removably disposed, or permanently secured in place.

The symbols are useful to identify the product within enclosure 10, as well as to promote the sale of the product within the enclosure. Where the top or bottom portion 12, 14 of enclosure 10 is made of a light transmissive material, the symbols may be disposed with enclosed space 26 for direct viewing therethrough.

As shown in FIGS. 5 and 6, the complimentary guide means 36, 38 disposed upon confronting surfaces of top and bottom edges 31, 33 or closure strip 30, may be circular bosses sized to be slidably received in guide means 32, 34 disposed upon the external side of top and bottom portions 12, 14. Alternately, complimentary guide means may be conical in shape, or elongated to resist premature rotation of closure strip 30 prior to extention of closure strip 30 substantially beyond the profile of enclosure 10 as previously disclosed.

Where complimentary guide means 36, 38 are elongated, the enlarged area 40 at one end of guide means 32, 34 should be sized to provide rotation of complimentary guide means 36, 38 within enlarged area 40 to enable closure strip 30 to be rotated into alignment with adjoining side 16, as previously disclosed.

Additionally, a detent 48 may be disposed in alignment with guide means 32, 34 along confronting top and bottom edges 31, 33 of closure strip 30 in spaced relation to aid in slidably aligning closure strip along guide means 32, 34. Where detent 48 is used, it should be tapered for ease of transition past the end of guide means 32, 34, and should not extend from top and bottom edges of closure strip 30 as far as complimentary guide means 36, 38.

A raised edge 46 may be disposed substantially along sides 16, 20 to a uniform height with side 22 along the top and bottom portions 12, 14 of aperature 10, for ease of stacking. While this raised edge 46 is not essential for use with the disclosed enclosure, it further provides a lip or edge, for a detent 48 on closure strip 30 to engage, when closure strip 30 is rotated to its open stored position.

It is believed to be within the scope of this invention to alternately position the aperature 24, not through side 22, but alternately through side 16, in a manner to provide an alternate embodiment of this invention. In this configuration closure strip 30 would be slidably biased along guide means 32 in FIG. 2, and would be rotated to close aperature 24 in side 16, when fully extended. To open enclosure 10, closure strip 30 would first be rotated into alignment with side 22, and manually biased along guide means 32, 34 to its open stored position. It is believed to be within the scope of one of average skill in this art, in light of this disclosure to adapt this invention to alternate configurations embodying the teaching disclosed herein. Therefore, while the invention has been described with reference to a particular embodiment, it is to be understood that modification may be made without departing from the spirit of the invention or from the scope of the following claims.

INDUSTRIAL APPLICABILITY

The recording disc enclosure of the present invention is used to store, transport, display and dispense a recording disc from the enclosure.

I claim:

1. A recording disc enclosure, which comprises:
   (a) a semi-rigid, generally rectangular top portion;
   (b) a semi-rigid, generally rectangular bottom portion substantially the size of the top portion;
   (c) four side portions adjoining said top and bottom portions about the periphery of said top and bottom portions, forming an enclosed area between said sides and said top and bottom portions, said enclosed area sized to receive a recording disc therein;
   (d) an elongated aperture disposed through one of the side portions, said aperture of a size sufficient to pass a recording disc therethrough;
   (e) an externally disposed top and bottom guide slot means, extending in parallel alignment substantially along the top and bottom portions of the enclosure in proximity to the aperture side;
   (f) an elongated closure strip having a side sized to substantially cover the elongated aperture, the closure strip further having top and bottom confronting portions adjoining the closure strip side in spaced relation;
   (g) a top and bottom guide post means, disposed upon the confronting top and bottom portions of the closure strip, the guide post means sized to align and guide the closure strip along the guide slot means from a closed position substantially covering the aperture to an intermediate extended position parallel to the aperture side; and
   (h) a relieved area disposed at one end of the top and bottom guide slot means, the relieved area positioned to receive the top and bottom guide post means when the closure strip is extended to the intermediate position, the relieved area providing a means for rotation of the extended closure strip from the intermediate position to a position tangent to the closed position of the closure strip, and adjacent to the side of the enclosure adjoining the aperture side.

2. The enclosure of claim 1 wherein the closure strip has a manual grasping surface disposed externally upon the top and bottom edges of the closure strip in proximity to the complimentary top and bottom guide means disposed in confronting relation upon the top and bottom edges of the closure strip.

3. The closure strip of claim 1, wherein the manual grasping surface is a series of grooves disposed upon the top and bottom edges of the closure strip tangent to the guide means disposed upon the top and bottom portions of the enclosure.

4. The enclosure of claim 1, wherein the top portion of the enclosure is molded of a light transmissive material to provide a visual indication of the contents within the enclosure, when viewed through the top portion of the enclosure.

5. The enclosure of claim 1, wherein the bottom portion of the enclosure is molded of a light transmissive material to provide a visual indication of the contents within the enclosure, when viewed through the bottom portion of the enclosure.

6. The enclosure of claim 1, wherein a pluarity of visual symbols are disposed upon at least one of the top and bottom portions of the enclosure, and upon at least one side of the enclosure.

7. The enclosure of claim 1, wherein the side portions of the enclosure are formed at least in part from at least one of the top and bottom portions of the enclosure, and the top and bottom portions of the enclosure are secured to each other in spaced relation to form an enclosed space therebetween of a size sufficient to receive a recording disc therein.

8. The enclosure of claim 1, wherein the enclosure is sized to receive a pamphlet in addition to the recording disc therein, the pamphlet sized to be received through the aperature disposed through one side of the enclosure.

9. The enclosure of claim 1, wherein the externally disposed top and bottom guide slot means are sized to extend substantially along the top and bottom portions of the enclosure in proximity to the aperture side, but are sized not to extend entirely to the adjoining aperture sides, in a manner to limit travel of the complimentary top and bottom guide post means disposed upon contronting sides of the closure strip, when the closure strip is extended to an opened or closed position.

10. An enclosure for protecting a recording disc therein, which comprises:

(a) a semi-rigid, generally rectangular top portion having at least three depending sides;
(b) a semi-rigid, generally rectangular bottom portion sized to align with the depending sides of the top portion;
(c) a means to secure the top and bottom portions in spaced relation to form an enclosed space of a size sufficient to receive a recording disc therebetween;
(d) an aperture disposed through one side of the enclosure, the aperture sized to receive a recording disc therethrough;
(e) an externally disposed top and bottom guide slot means, extending in parallel alignment substantially along the top and bottom portions of the enclosure in proximity to the aperture side;
(f) an elongated closure strip having a closure side with adjoining top and bottom confronting sides, the closure strip sized to extend substantially the length of the aperture in a closed position, with confronting top and bottom sides of the closure strip closely received about the guide slot means;
(g) a top and bottom guide post means, disposed upon the confronting top and bottom sides of the closure strip, the guide post means positioned to align and guide the closure strip along the top and bottom guide slot means;

wherein the closure strip may be manually biased from the closed position to an intermediate extended position in parallel alignment with the closed position, and subsequently rotated from the intermediate extended position to a position adjacent to the side adjoining the aperture side and tangent to the closed position of the closure strip.

11. The enclosure of claim 10, wherein the top and bottom portions of the enclosure are secured in spaced relation by ultrasonic welding.

12. The enclosure of claim 10, wherein the top and bottom portions of the enclosure are secured in spaced relation by heat staking.

13. The enclosure of claim 10, wherein the top and bottom portions of the enclosure are secured in spaced relation by snap lock and socket fastener.

14. The enclosure of claim 10, wherein the top portion is molded of a light transmissive material to provide a visual indication of the contents within the enclosure, when viewed through the top portion.

15. The enclosure of claim 10, wherein the bottom portion is molded of a light transmissive material to provide a visual indication of the contents within the enclosure, when viewed through the top portion.

16. The enclosure of claim 10, wherein visual symbols are disposed upon at least one of the top and bottom portions of the enclosure, and upon at least one adjoining side of the enclosure.

* * * * *